United States Patent [19]

Cerrato et al.

[11] 4,171,004

[45] Oct. 16, 1979

[54] SAFETY REGULATOR FOR FLUID PRESSURE

[75] Inventors: Vincent Cerrato, Pomona; James Hines, Port Jervis, both of N.Y.

[73] Assignee: Vending Components, Inc., Hackensack, N.J.

[21] Appl. No.: 815,267

[22] Filed: Jul. 13, 1977

[51] Int. Cl.² ........................................... G05D 16/06
[52] U.S. Cl. ................................ 137/116; 137/116.5; 137/505.11
[58] Field of Search ................... 137/115, 116, 116.5, 137/505.11, 119

[56] References Cited

U.S. PATENT DOCUMENTS

| 90,483 | 5/1869 | Bartholomew | 137/119 |
|---|---|---|---|
| 2,103,299 | 12/1937 | Ravnsbeck | 137/115 |
| 3,547,143 | 12/1970 | Mills | 137/505.11 X |
| 3,606,904 | 9/1971 | Taylor | 137/115 X |
| 3,741,182 | 6/1973 | Wade | 137/115 X |

FOREIGN PATENT DOCUMENTS

| 2519026 | 11/1975 | Fed. Rep. of Germany | 137/119 |
|---|---|---|---|
| 392280 | 7/1973 | U.S.S.R. | 137/119 |

*Primary Examiner*—Robert G. Nilson
*Attorney, Agent, or Firm*—Roy C. Hopgood; John M. Calimafde; Charles W. Neill

[57] ABSTRACT

This safety device has a delivery outlet and a pressure-relief valve for venting gas from a source of gas when the gas pressure rises above a predetermined maximum. A delivery line supplies gas from the source to a place of use, and there is a delivery line shut-off valve which shuts off flow to the place of use whenever the relief valve opens by a substantial distance from its seat. This prevents piping and hoses communicating with the delivery line from being subjected to excess pressure in the event that pressure rises faster than the relief valve can vent the excess pressure.

10 Claims, 2 Drawing Figures

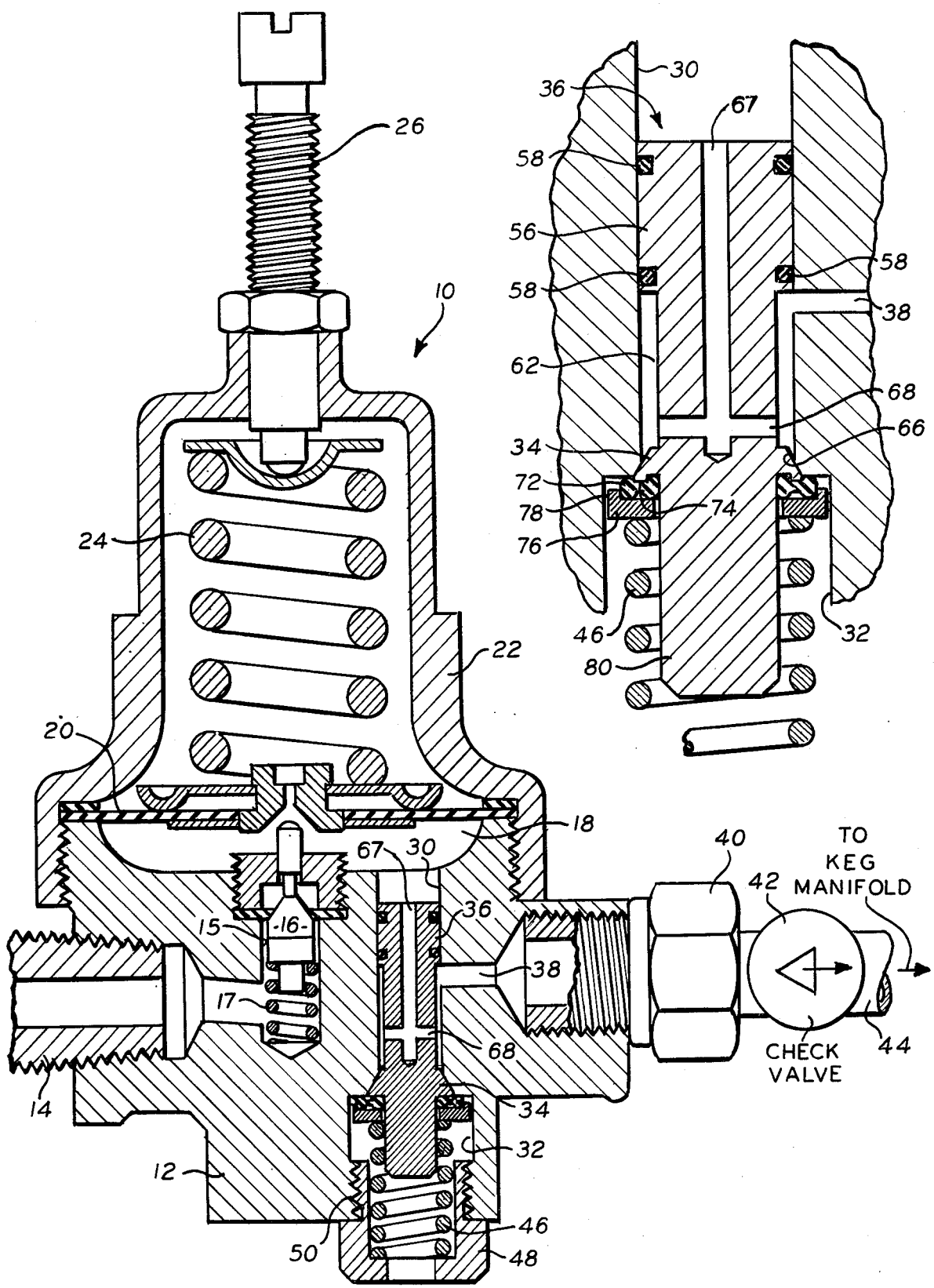

4,171,004

SAFETY REGULATOR FOR FLUID PRESSURE

BACKGROUND AND SUMMARY OF THE INVENTION

It is common practice to supply gas to containers for beer or soda to maintain a pressure for causing discharge of beer or soda from the container when a faucet is opened; and in taverns there are often numerous beer kegs supplied with such pressure from a manifold. Similar installations are used for taking gas at high pressure, as from a cylinder, and delivering the gas at reduced pressure for various operations. It is also common practice to install pressure relief valves in supply lines so that the pressure will be vented to the atmosphere in the event that it rises above a predetermined maximum pressure. Pressure regulators for liquids are also provided with pressure relief valves.

This invention will be described in connection with a regulator for supplying gas to beer kegs, as the preferred embodiment, but it will be understood that it can be used for controlling flow of any fluid where the installation requires the protection of a pressure relief valve, commonly referred to as a "safety valve," and it is desirable to shut off flow of the fluid to the place of use whenever there is a substantial presure rise that operates the safety valve.

Accidents and unusual conditions sometimes cause the pressure to build up in a regulator faster than the relief valve can vent the pressure. There are various safety devices which can be used to stop all flow through a pipe if the rate of flow becomes excessive, and there are other safety controls; but the purpose of the present invention is to modify a pressure regulator in a simple and inexpensive way so as to protect piping, manifolds, hoses and other apparatus, on the downstream side, from being exposed to excessive pressure when the safety valve of the pressure regulator is unable to vent the gas fast enough to relieve the pressure.

This invention installs a safety shut-off valve which automatically closes the reduced pressure delivery line from the regulator whenever the relief valve opens and regardless of whether the relief valve is capable of venting the excess pressure rapidly enough to prevent any build-up substantially higher than that for which the pressure-relief valve is loaded.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic sectional view, partly broken away, showing a pressure regulator equipped with the delivery line shut-off valve of this invention; and FIG. 2 is a greatly enlarged detail view showing a portion of the structure of FIG. 1 on a larger scale.

DESCRIPTION OF PREFERRED EMBODIMENT

FIG. 1 shows a pressure regulator 10 having a body 12 with an inlet connection 14 which supplies gas at high pressure to a valve chamber 15. A valve 16 is held in closed position by a spring 17 and only opens when the valve is pressed downward by a greater force.

Within the regulator body 12, there is a reduced pressure chamber 18 at the top of the regulator body closed by a flexible diaphragm 20 which is clamped against the regulator body by a bonnet 22 attached to the body 12 by screw threads.

A loading spring 24 is compressed by the bonnet 22 against the upper side of the diaphragm 20. This spring pressure pushes the diaphragm 20 downward into contact with the stem of the valve 16 so that the valve 16 opens and admits gas into the chamber 18. As gas flows into the chamber 18, the pressure under the diaphragm 20 increases and eventually forces the diaphragm upward against the pressure of the loading spring 24 and the downward pressure on the valve 16 decreases until the valve is again closed by its lower spring 17.

An adjusting screw 26 can be used to compress the spring 24 so as to increase the loading on the diaphragm when the screw 26 is rotated in one direction. Rotation of the screw 26 in the opposite direction will relieve some of the pressure on the spring 24; and thus the spring 24 determines, within certain limits, the amount of pressure that must build up in the reduced pressure chamber 18 in order to shut off further flow of gas from the high pressure inlet 14.

The description thus far is a conventional pressure regulator, and it will be understood that such pressure regulators have a passage leading from the reduced pressure chamber 18 to a delivery line; and also have pressure-relief valves for venting gas from the reduced pressure chamber 18 in the event that the pressure in the reduced pressure chamber becomes excessive as a result of leakage of the valve 16, or other causes.

The improved regulator shown in the drawing has a passage 30 leading from the reduced pressure chamber 18 on one side of the regulator body 12 through an opening 32 at the other side of the regulator body, and there is a spring-loaded pressure-relief valve 34 in the passage 30 which opens whenever the pressure in the reduced pressure chamber 18 exceeds the pressure for which the relief valve 34 is loaded.

There is a delivery line shut-off valve 36 located in the passage 30, and this valve acts as a slide valve to open and close a delivery line 38 of the regulator. The delivery line leads through various fittings 40 in series with a check valve 42 and tubing 44 which delivers the reduced pressure gas from the regulator to a manifold, hoses or other places of use.

The construction of the delivery line shut-off valve and its operation will be described in detail in connection with FIG. 2. The pressure-relief valve 34 is held in closed position by a spring 46 which is compressed between the structure of the valve 34 and a spring retainer 48 which has a socket into which the spring extends and which has threads 50 that engage in complementary threads in an enlarged diameter portion of the passage 30 downstream from the valve 34.

FIG. 2 shows the delivery line shut-off valve 36, which is slidable axially in the passage 30. This valve 36 has an upper portion 56 which slides in the passage 30 as a piston. This piston portion has sealing rings 58 located in grooves formed in the circumference of the piston portion 56. These rings 58 seal the clearance between the circumference of the piston portion 56 and the wall of the passage 30 to prevent flow of gas along such clearance.

Below the piston portion 56, the delivery line shut-off valve 36 has a reduced diameter portion 62, and there is substantial clearance between the wall of the passage 30 and this reduced diameter portion 62. The pressure-relief valve 34 is at the lower end of this reduced diameter portion 62, and the valve 34 closes against a seat 66.

When the regulator is operating normally with the pressure relief valve 34 closed, as shown in FIG. 2, gas from the reduced pressure chamber flows downward through the passage 30 and into an axially-extending passage 67 in the delivery line shut-off valve 36. This axially extending passage 67 extends downward to the vicinity of the pressure-relief valve 34, and on the upstream side of the pressure-relief valve 34 there is a cross passage 68 through which gas can flow from the axially-extending passage 67 through the circumferential surface of the reduced diameter portion 62 of the valve 36. The reduced pressure gas thus enters the clearance between the reduced diameter portion 62 and the confronting sidewall of the passage 30.

The delivery line 38 communicates with this clearance at the upper end of the reduced diameter portion 62, and with the relief valve 34 closed, gas at reduced pressure can flow into the delivery line 38 and to the piping or other equipment to which gas is to be supplied.

In the event that the pressure in the reduced pressure chamber of the regulator and the passage 30 becomes greater than a predetermined maximum, this pressure exerted against the upper end of the delivery line shut-off valve 36 pushes the valve down and moves the pressure-relief valve 34, which is an integral part of the delivery line shut-off valve 36, so that the pressure-relief valve moves downward in FIG. 2 and opens a clearance between itself and its seat to permit the escape of gas through the opening 32 in the regulator body. This downward movement of the delivery line shut-off valve 36 causes the piston portion 56 of the valve 36 to cover the portion of the passage 30 through which the delivery line 38 communicates with the interior of the regulator. Flow of gas through the delivery line 38 is thus progressively shut off, and if the excess pressure is substantial, and the pressure relief valve 34 is forced to open very wide, and the sealing ring 58 at the lower end of the piston portion 56 will seal off the delivery line 38, so that there can be no flow of gas from the regulator into the delivery line 38. Thus, no matter how high the pressure may rise in the regulator, because of inability of the relief valve 34 to vent the gas fast enough, the delivery line 38 is sealed against any increase in pressure.

FIG. 2 also shows a novel construction of the pressure-relief valve 34, which prevents possible leaking of the relief valve during normal opration and which at the same time is a simple and inexpensive seal. A quad ring 72, preferably made of elastomeric material, spans the region where the downstream face of the valve 34 contacts the valve seat. Quad rings are shaped so that they have depressions in both their front and back faces. The valve 34 has a ridge 74 extending around the outer circumferential portion of the valve 34, and this ridge extends into the upper depression of the quad ring 72.

A washer 76 is pressed against the quad ring 72 and holds the quad ring against the lower side of the valve 34 and the adjacent structure below the seat 66. This washer 76 has a circumferential rim 78 which is an integral part of the washer and which extends around the outside circumference of the quad ring 72.

A valve stem 80 extends downward from the valve 34, and the quad ring is thus held in place by the valve stem 80, the ridge 74 and the circumferential portion 78 of the washer 76 while being urged upward by the pressure of the spring 46 against the washer 76.

The quad ring 72 prevents possible leakage of the pressure relief valve which preferably has metal-to-metal contact with its seat.

The preferred embodiment of the invention has been illustrated and described. Changes in connection between the pressure-relief valve and the delivery line shut-off valve, and other changes and modifications can be made, without departing from the invention as defined in the claims.

What is claimed is:

1. A safety device for supplying gas under controlled pressure including in combination a source of gas under said controlled pressure, a delivery line through which the gas flows to apparatus in which the gas pressure is used to maintain pressure in a beer keg or the like, an automatic pressure-relief valve that vents excess gas to the ambient atmosphere, a passage through which the pressure-relief valve is in communication with the source of gas, a valve seat at the end of said passage and against which the pressure relief valve seats when in closed position, means holding the pressure-relief valve closed in contact against said seat at pressures below a predetermined maximum, a motion transmitting connection operated by the pressure-relief valve, a safety shut-off valve movable into position to stop flow of gas from the source of gas pressure to said delivery line when excessive gas flow to the pressure relief valve is greater than the rate at which the gas can be vented by the pressure relief valve and gas pressure builds up in the delivery line, the safety shut-off valve being connected with said motion transmitting connection and operated thereby to close the safety shut-off valve when the pressure-relief valve is moved into an open position by said excessive gas flow, and a check valve in position to prevent back flow of gas from said beer keg through said delivery line.

2. The safety device described in claim 1 characterized by the pressure relief valve and the safety shut-off valve and the motion transmitting connections between the valves being an assembly of integral construction.

3. The safety device described in claim 2 characterized by part of the pressure-relief valve and part of the safety shut-off valve and the motion transmitting connection being of one-piece construction.

4. The safety device described in claim 1 characterized by the passage through which the pressure-relief valve is in communication with the source of gas having a valve seat for the pressure-relief valve near one end thereof the safety shut-off valve being located in said passage, and the pressure-relief valve being a poppet valve that closes against said valve seat.

5. The safety device described in claim 4 characterized by the safety shut-off valve being a slide valve in said passage with a portion of the slide valve in position to close off communication between the source of gas and the delivery line when the pressure-relief valve moves into open position.

6. The safety device described in claim 1 characterized by the delivery line opening into the passage through which the pressure-relief valve communicates with the source of gas, said opening being at a location between the pressure-relief valve and the source of gas, and the safety shut-off valve being a slide valve in said passage and connected with the pressure-relief valve by a connection dimensioned so as to cover the opening of the delivery line into said passage when the pressure-relief valve opens, and to uncover the opening of the delivery line when the pressure-relief valve closes.

7. The safety device described in claim 6 characterized by the safety shut-off valve being a piston and having grooves near its opposite ends containing elastomeric sealing rings for preventing gas from reaching the opening of the delivery line into said passage when the pressure-relief valve is in open position.

8. A safety device for supplying gas under controlled pressure to beer kegs, manifolds and the like, including a source of gas under said controlled pressure, a delivery line through which the gas flows to apparatus in which the gas pressure is to be used, characterized by a pressure-relief valve, a passage through which the pressure-relief valve is in communication with the source of gas, means holding the pressure-relief valve closed at pressures below a predetermined maximum, a motion transmitting connection operated by the pressure-relief valve, a safety shut-off valve movable into position to stop flow of gas from the source of gas pressure to said delivery line, the safety shut-off valve being connected with said motion transmitting connection and operated thereby to close the safety shut-off valve when the pressure-relief valve moves into an open position by a substantial distance from its closed position and further characterized by the source of gas including a regulator having a diaphragm therein that forms one side of a reduced pressure chamber, a spring that loads the diaphragm to move it into position to close the valve that controls the flow of gas from a high pressure inlet and into the reduced pressure chamber, the passage through which the pressure-relief valve communicates with the reduced pressure chamber leading from the reduced pressure chamber on one side of the regulator body on which the diaphragm is located and through the body to an outlet on the other side thereof, said passage being a straight cylindrical bore with a shoulder intermediate its ends, said shoulder constituting a valve seat, the bore being of larger diameter on the side of the valve seat away from the reduced pressure chamber, a plunger in the bore with a portion of the plunger that is nearer to the reduced pressure chamber of a diameter that slides in the bore as a piston, sealing rings that prevent leakage of gas through clearances between the piston portion of the plunger and the wall of the bore, the plunger being of less diameter beyond the piston portion, the pressure-relief valve being at the end of the part of the plunger that is of less diameter, a part of the pressure-relief valve being an integral part of the plunger, a longitudinal center bore through the plunger, from the end of the plunger that is nearer to the reduced pressure chamber and extending into the part of the plunger that is of less diameter, a port opening from the center bore through the circumference of the plunger at the less diameter portions thereof, the delivery line opening into the bore at a location just beyond the piston portion of the plunger on the side of the piston portion remote from the reduced pressure chamber and when the pressure-relief valve is in closed position, the delivery line being of a cross-section that is covered by the piston portion of the plunger when the pressure relief valve moves into position to vent gas from the reduced pressure chamber, through the central bore of the plunger, and through the port opening from the center bore through the circumference of the less diameter portion of the plunger.

9. A safety device for supplying gas under controlled pressure to beer kegs, manifolds and the like, including a source of gas under said controlled pressure, a delivery line through which the gas flows to apparatus in which the gas pressure is to be used, characterized by a pressure-relief valve, a passage through which the pressure-relief valve is in communication with the source of gas, means holding the pressure-relief valve closed at pressures below a predetermined maximum, a motion transmitting connection operated by the pressure-relief valve, a safety shut-off valve movable into position to stop flow of gas from the source of gas pressure to said delivery line, the safety shut-off valve being connected with said motion transmitting connection and operated thereby to close the safety shut-off valve when the pressure-relief valve moves into an open position by a substantial distance from its closed position characterized by the pressure-relief valve including a rigid poppet valve element that contacts with a valve seat, a sealing ring of elastomeric material at the downstream end of the valve element and spanning the location where the downstream end of the valve element contacts with the seat, a washer in contact with the ring, and a spring holding the washer against the ring to hold the ring in contact with a downstream surface of the valve element, and said washer also holding the outer circumferential portion of the washer in contact with the downstream side of structure adjacent to the valve seat.

10. A safety device for supplying gas under controlled pressure to beer kegs, manifolds and the like, including a source of gas under said controlled pressure, a delivery line through which the gas flows to apparatus in which the gas pressure is to be used, characterized by a pressure-relief valve, a passage through which the pressure-relief valve is in communication with the source of gas, means holding the pressure-relief valve closed at pressures below a predetermined maximum, a motion transmitting connection operated by the pressure-relief valve, a safety shut-off valve movable into position to stop flow of gas from the source of gas pressure to said delivery line, the safety shut-off valve being connected with said motion transmitting connection and operated thereby to close the safety shut-off valve when the pressure-relief valve moves into an open position by a substantial distance from its closed position characterized by the pressure-relief valve including a rigid poppet valve element that contacts with a valve seat, a circular ridge extending from the downstream circumferential portion of the valve element, a quad ring of elastomeric material at the downstream end of the valve element and spanning the location where the downstream end of the valve element contacts with the seat, a depression in the surface of the quad ring fitting over the circumferential ridge, a washer in contact with the quad ring and having a circular shoulder overlapping part of the outer circumference of the washer, and a spring holding the washer against the quad ring to hold the quad ring in contact with the circular ridge and with a face of the valve element radially inward of the ridge, said washer also holding the outer circumferential portion of the washer in contact with the downstream side of the structure adjacent to the valve seat, and a valve stem extending downstream from the valve and spaced radially inward from a wall of a socket in which is located the spring that loads the pressure-relief valve.

* * * * *